C. R. SCHLEY.
NURLING TOOL.
APPLICATION FILED APR. 6, 1914.
1,112,662.
Patented Oct. 6, 1914.
3 SHEETS—SHEET 3.
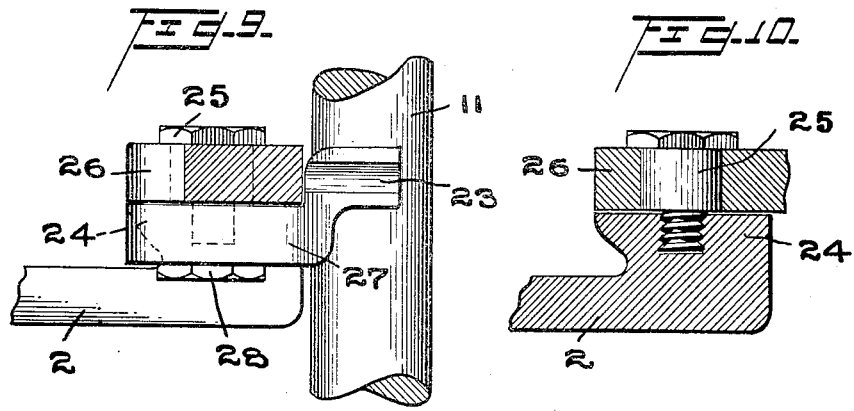
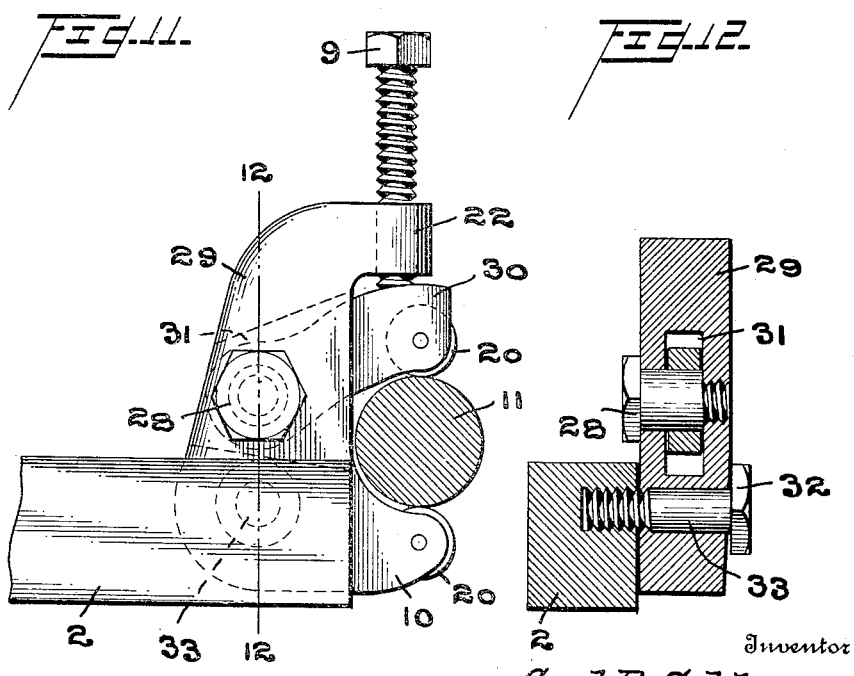
Inventor
Carl R. Schley
By Joshua R. H. Potts
Attorney

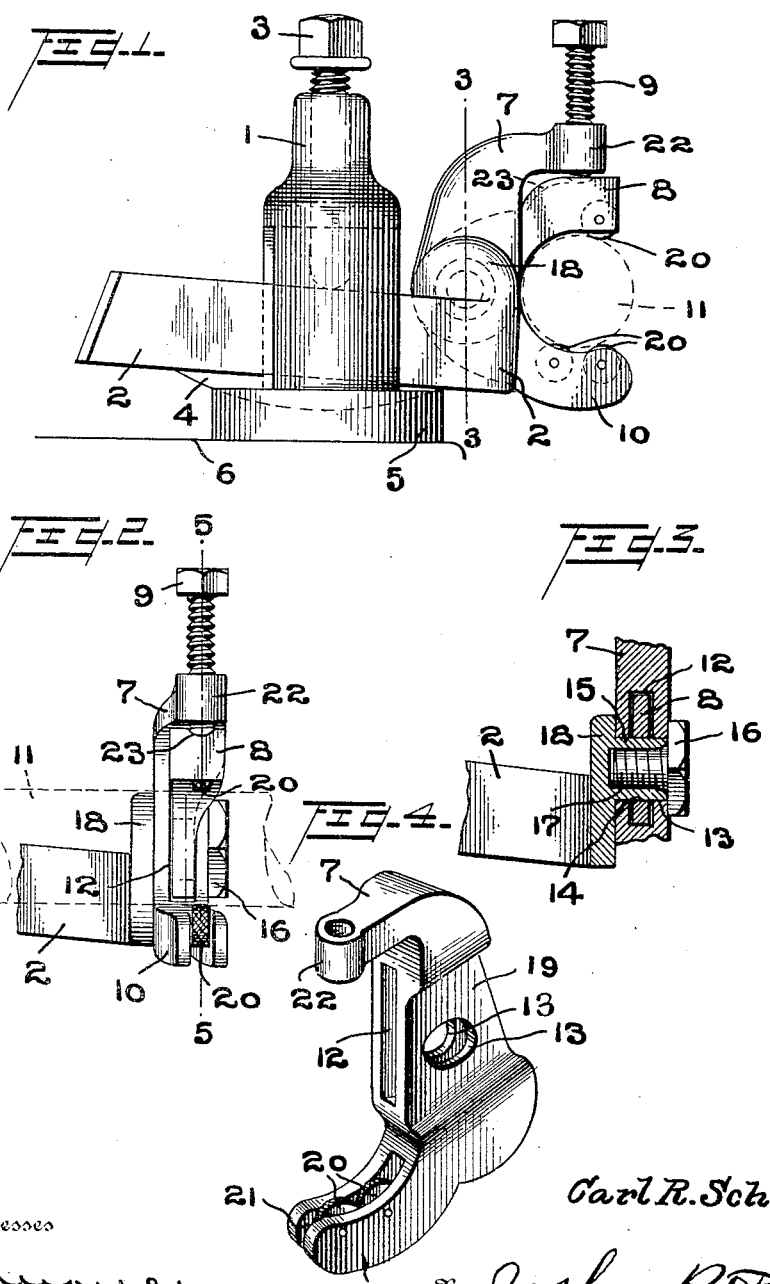

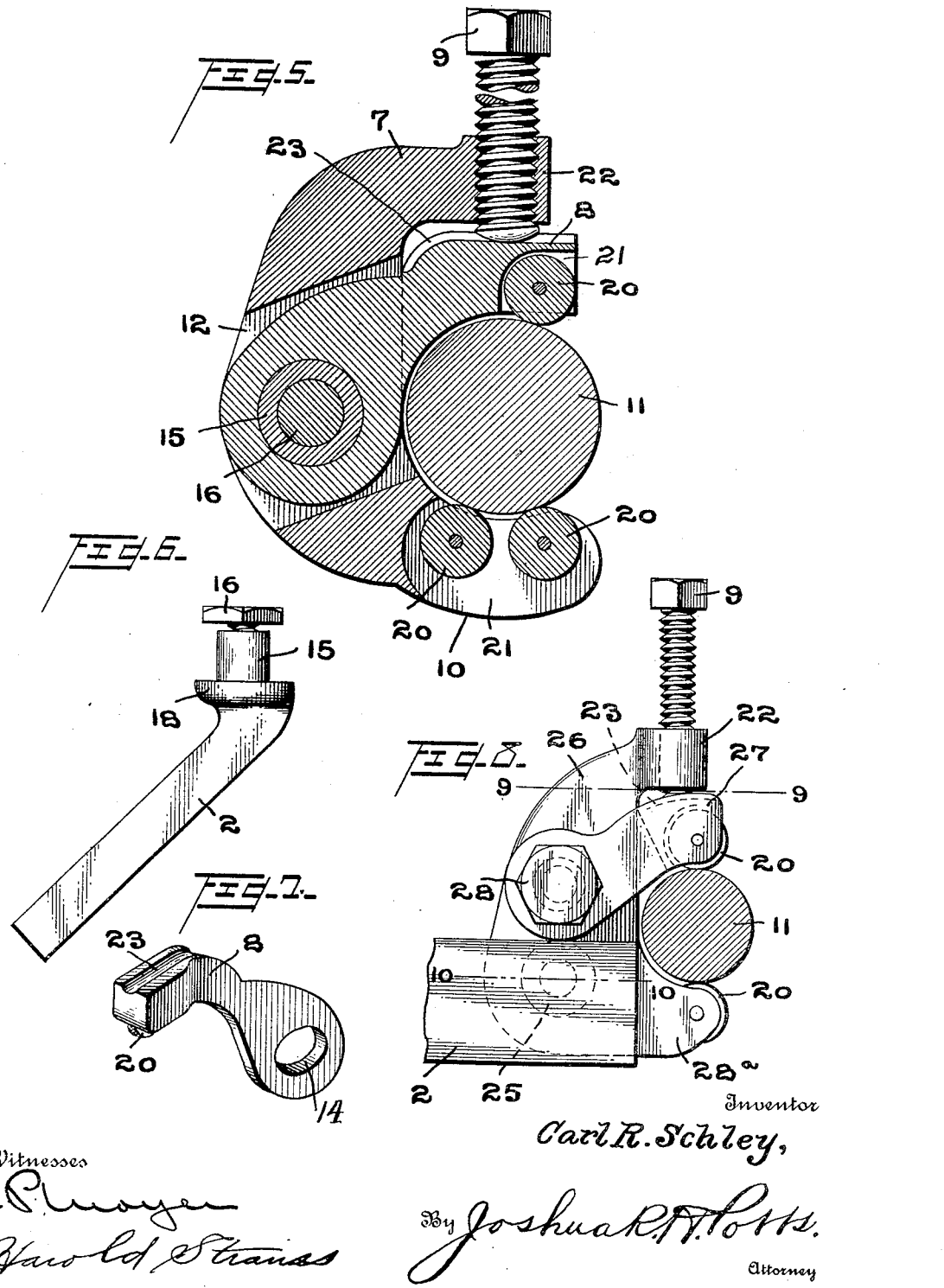

UNITED STATES PATENT OFFICE.

CARL RUDOLF SCHLEY, OF PHILADELPHIA, PENNSYLVANIA.

NURLING-TOOL.

1,112,662. Specification of Letters Patent. Patented Oct. 6, 1914.

Application filed April 6, 1914. Serial No. 830,034.

*To all whom it may concern:*

Be it known that I, CARL R. SCHLEY, a citizen of the United States, residing at Philadelphia, in the county of Philadelphia and State of Pennsylvania, have invented certain new and useful Improvements in Nurling-Tools, of which the following is a specification.

My invention relates to improvements in nurling tools, the object of the invention being to provide an improved nurling tool which will not cause excessive wear on the shears of the lathe or the bearings in the headstock.

A further object is to provide a nurling tool of the character stated which will have no tendency to bend the shaft or tube being nurled as the parts operate on a clamping principle rather than by a pressure action such as ordinary nurling tools do.

A further object is to provide a nurling tool of the character stated which may be operated close up to the chuck of a machine and which will not push the lathe centers out of alinement.

A further object is to provide a nurling tool of the character stated of strong and durable construction, and capable of a wide range of usefulness on various types of machine.

With these and other objects in view, the invention consists in certain novel features of construction and combinations and arrangements of parts as will be more fully hereinafter described and pointed out in the claims.

In the accompanying drawings: Figure 1 is a view in side elevation illustrating the preferred form of my improved nurling tool. Fig. 2 is a view in end elevation showing the shaft to be nurled in dotted lines. Fig. 3 is a view in section on the line 3—3 of Fig. 1. Fig. 4 is perspective view of one member of the nurling tool. Fig. 5 is a view in longitudinal section on an enlarged scale taken on the staggered line 5—5 of Fig. 2. Fig. 6 is a fragmentary plan view of the stock 2. Fig. 7 is a perspective view of the other nurling tool member. Fig. 8 is a view in side elevation illustrating a modification. Fig. 9 is a view in horizontal section on the line 9—9 of Fig. 8. Fig. 10 is a fragmentary view in longitudinal section on the line 10—10 of Fig. 8. Fig. 11 is a view in side elevation illustrating another modification, and Fig. 12 is a view in section on the line 12—12 of Fig. 11.

Referring to my improved nurling tool illustrated in Figs. 1 to 7 inclusive, 1 represents the ordinary tool post of a lathe or other like machine in which the stock 2 is secured by a clamping screw 3. 4 is the ordinary wedge interposed between the ring 5 and stock 2 and capable of adjustment to vary the angle of the stock, while 6 represents a fragmentary portion of the ordinary lathe cross slide.

While I refer to my improvements in connection with a lathe, I would have it understood that I may use the same with screw machines, turret lathes, and various other mechanisms, and am not limited in the use.

My improved nurling tool comprises two members 7 and 8, the former I shall refer to as a "frame", and the latter as an "arm". The frame 7 is of general yoke shape, and at one end has a fixed arm 10 which coöperates with the arm 8, the latter being pivoted to the frame 7. The frame 7 has a slot 12 to receive one end of the arm 8, said frame and arm having registering openings 13 and 14 respectively for the reception of an integral journal 15 on the stock 2.

16 represents a headed screw engaging in a threaded socket 17 in journal 15, and holding the nurling tool on the stock, the stock being enlarged at its outer end as shown clearly at 18 to locate the pivotal juncture of the two members in a plane sufficiently high to properly perform the functions of the device. It will also be noted, particularly by reference to Fig. 6, that the stock 2 is bent so that the other parts are located at an angle to the stock and may be positioned close up to the chuck of the lathe when at work.

The frame 7 is recessed at one side as shown at 19 to accommodate the head of screw 16 and prevent any protuberance from this surface as it is desirable in many cases to nurl close up to the chuck.

The pivoted arm 8 and the stationary arm 10 carry nurls 20, and while the invention is not limited to any particular number of nurls, I preferably provide one on the arm 8 and two on the fixed arm 10, although this number may, of course, be varied and the nurls variously arranged.

The invention is not limited to any particular mount for the nurls, although I preferably recess the members as shown at 21 to accommodate or house the greater portion of the nurls, allowing only a relatively small periphery to project from the surface sufficiently to engage the shaft 11 to be nurled.

While I shall hereinafter refer to the article being nurled as a "shaft", it is to be understood that this term is selected arbitrarily, as any article can be nurled as well as a shaft.

The upper end of the frame 7 is provided with an integral screw-threaded sleeve 22 to receive an adjusting screw 9. The lower end of the screw 9 is preferably rounded and engages in a groove 23 in the upper surface of arm 8. It will be noted that this upper surface of the arm 8 curves longitudinally, so that by the downward adjustment of the screw 9, the arm 8 will be forced toward the fixed arm 10, the lower end of the screw riding in the groove 23 and which prevents a side movement of the end of arm 8 at all positions of adjustment.

In the modification illustrated in Figs. 8, 9, and 10, the stock 2 is provided with a laterally projecting enlargement 24 at its free end to receive a screw 25 connecting the frame 26 of the nurling tool to the stock. In this form of my invention, the pivoted arm 27 corresponding to arm 8 of the preferred form is laterally off-set as cleary shown in Fig. 9, and has a pivot screw 28 entirely independent of the screw 25. In this modified form, I provide but single nurl 20 on the pivoted arm 27, and also on the fixed arm 28ª, but of course the number of nurls may be varied.

In the modification illustrated in Figs. 11 and 12, I provide improved means for clamping the frame 29 to the stock 2, which clamping means also operates to bind the pivoted arm 30 corresponding to arms 8 and 27 of the forms above described. In this modification, the arm 30 is located in a slot 31 in frame 29, and the walls of this slot are pressed toward each other by the action of the head 32 of the screw 33.

It will be noted, particularly by reference to Fig. 12, that the wall of frame 29 is at an incline so that the head 32 of screw 33 engages at its upper portion only, hence the pressure of the head inwardly serves to press the walls of the slot 31 toward each other, at the same time frictionally binding the frame to the stock. This clamping action prevents any pivotal movement of the nurling tool after it is once set.

In the several modifications, I have used like reference numerals to indicate like parts corresponding with the preferred form.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A nurling tool comprising a frame having a fixed arm at one end, and an adjusting screw at its other end, an arm pivoted at one end to an intermediate portion of the frame and engaged by the screw, and nurls carried by both of said arms, substantially as described.

2. A nurling tool comprising a frame having a fixed arm at one end, and an adjusting screw at its other end, an arm pivoted to the frame and engaged by the screw, said pivoted arm having a longitudinal groove in one edge into which the screw projects, and nurls carried by both of said arms, substantially as described.

3. The combination with a stock, of a frame pivotally connected to the stock and having a fixed arm at one end, and an internally screw-threaded bearing at its other end, an arm pivoted at one end to an intermediate portion of the frame, a screw in said bearing engaging the pivoted arm, and nurls carried by both of said arms, substantially as described.

4. The combination with a stock, of a frame pivotally connected to the stock and having a fixed arm at one end, and an internally screw-threaded bearing at its other end, an arm pivoted at one end to an intermediate portion of the frame, a screw in said bearing engaging the pivoted arm, a plurality of nurls on one of said arms, and a single nurl on the other of said arms, substantially as described.

5. The combination with a stock having an enlargement at one end, of a frame having a fixed arm at one end and an internally screw-threaded bearing at its other end, an arm, a screw pivotally securing the last-mentioned arm to the intermediate portion of the frame and also securing the frame to the enlargement of the stock, a screw in said bearing engaging the pivoted arm, and nurls carried by both of said arms, substantially as described.

6. The combination with a stock, of a frame pivotally connected to the stock and having a fixed arm at one end, and an internally screw-threaded bearing at its other end, an arm pivoted to the frame, a screw in said bearing engaging the pivoted arm, nurls carried by both of said arms, and said stock bent at an angle adjacent its point of attachment with the frame, substantially as described.

7. The combination with a stock, of a frame pivotally connected to the stock and having a fixed arm at one end, and an internally screw-threaded bearing at its other end, an arm pivoted to the frame, a screw in said bearing engaging the pivoted arm, a plurality of nurls on one of said arms, a single nurl on the other of said arms, and said stock bent at an angle adjacent its point of attachment with the frame, substantially as described.

8. The combination with a stock having an enlargement at one end, of a frame having a fixed arm at one end and an internally screw-threaded bearing at its other end, an arm, a screw pivotally securing the last-mentioned arm to the intermediate portion of the frame and also securing the frame to the enlargement of the stock, a screw in said bearing engaging the pivoted arm, nurls carried by both of said arms, and said stock bent at an angle adjacent its point of attachment with the frame, substantially as described.

In testimony whereof I have signed my name to this specification in the presence of two subscribing witnesses.

CARL RUDOLF SCHLEY.

Witnesses:
DAVID T. O'CONNELL,
FRANCIS J. MORRISSEY.

Copies of this patent may be obtained for five cents each, by addressing the "Commissioner of Patents, Washington, D. C."